United States Patent [19]

Takabayashi

[11] Patent Number: 5,105,142
[45] Date of Patent: Apr. 14, 1992

[54] CELL DISCHARGING CIRCUIT FOR A FUEL CELL

[75] Inventor: Yasuhiro Takabayashi, Kanagawa, Japan

[73] Assignee: Fuji Electric Co., Ltd., Kawasaki, Japan

[21] Appl. No.: 384,686

[22] Filed: Jul. 25, 1989

[30] Foreign Application Priority Data

Aug. 1, 1988 [JP] Japan ................... 63-190682

[51] Int. Cl.⁵ .................. H02J 7/00; H02J 7/34; H01M 10/44; H01M 8/00
[52] U.S. Cl. .............................. 320/3; 429/13; 429/23
[58] Field of Search ............ 320/2, 3, 15; 429/12, 429/13, 19, 23, 24

[56] References Cited

U.S. PATENT DOCUMENTS

| 3,443,115 | 5/1969 | Timmerman, Jr. | 320/3 X |
| 3,823,358 | 7/1974 | Rey | 320/3 |
| 4,670,702 | 6/1987 | Yamada et al. | 320/3 X |
| 4,931,947 | 6/1990 | Werth et al. | 320/3 X |

FOREIGN PATENT DOCUMENTS 233974 10/1986 Japan .

Primary Examiner—R. J. Hickey
Attorney, Agent, or Firm—Spencer & Frank

[57] ABSTRACT

A discharging circuit can be made compact by forming a discharging path for the fuel cell via a fixed resistor. Even if the operation of a fuel cell is interrupted and/or a control power source for supplying electric power to a controlling circuit is interrupted, the discharging circuit is operated in response to a voltage produced through an electrolysis of the gas which is left in the fuel cell. As a result, the fuel cell can discharge, while the degradation of the fuel cell is prevented.

13 Claims, 6 Drawing Sheets

CELL DISCHARGING CIRCUIT FOR A FUEL CELL

BACKGROUND OF THE INVENTION

1. Field of the Invention

The present invention relates to a cell discharging circuit for use with a fuel cell when the operation of a fuel cell generation system is interrupted or when a control power supply failure occurs.

2. Description of the Prior Art

As to a fuel cell, it is well known that an electrode is degraded when the temperature of the electrode is high (approximately 170° to 200° C. in operation) and a generation voltage from the fuel cell is 0.8 volt/cell or more (no-load voltage=so-called open voltage=1 to 1.1 volts/cell).

When a fuel cell generation system in an operating state changes into a halt state, the temperature of the fuel cell becomes high and electric power supplied to a load is halted, whereby the fuel cell goes into a no-load state. When this occurs, the generated voltage rises, and a condition for degradation of the fuel cell is established.

When the generation system stops, the fuel supply to the fuel cell is shut off by an electromagnetic valve, or the like. At the same time, fuel gas remains in the body or pipings of the fuel cell.

In order to overcome this problem, it is known to decrease the terminal voltage of the fuel cell to 0.8 volt/cell using a circuit for discharging at the time operation is interrupted, and to consume the remaining gas using a discharging resistor.

FIGS. 1 and 2 show a fixed resistor type discharging circuit and its operational timing chart, respectively.

The circuit for discharging is mainly used for a small capacity (for example, several kW) fuel cell power generation system. The output power of the fuel cell (FC) 1 is converted by a converter (CNV) 2 to an alternating current which is supplied to a load 3. A controlling circuit 4 outputs a halt command to stop operation of the fuel cell 1 using switch 5 (SWD). Power to drive controlling circuit 4 is supplied by a control power source 6.

When the switch 5 operates a normally-opened contact 9a is closed to form the discharging circuit. A discharging resistor 7 (RD) consumes electric power generated by the remaining gas in the fuel cell 1.

FIGS. 3 and 4 show a variable resistor type circuit for discharging and the operational timing chart, respectively. In FIG. 3, the same reference numerals are given to the corresponding elements shown in FIG. 1.

The circuit for discharging shown in FIG. 3 is mainly used for a large capacity (for example, several tens kW or more) fuel cell power generation system. Japanese Patent Application Laid-open No. 61-233974, discloses a main terminal voltage control system of the fuel cell. The terminal voltage of the fuel cell 1 is detected by a voltage detector (VD) 8, and then the detected results are applied to the controlling circuit 4. When the controlling circuit 4 outputs a halt command for the fuel cell 1, the switches (SWD1, SWD2, ... SWDn) operate and those contacts 9a1, 9a2, ... 9an are closed. As the switches (SWD1, SWD2 ... SWDn) are closed respectively and sequentially, the terminal voltage of the fuel cell 1 is gradually decreased.

However, the above-mentioned circuit of FIG. 1 has a disadvantage that a discharging circuit is not formed upon a power failure of the control power source, since the discharging circuit is actuated by the switch 5.

Furthermore, since the discharging circuit of FIG. 3 is a complicated arrangement it is disadvantageous because it is bulky. Furthermore, the discharging circuit is not formed when a power failure occurs in the control power source as in the circuit of FIG. 1.

SUMMARY OF THE INVENTION

It is an object of the present invention to provide a discharging circuit which can solve the above-mentioned problems.

It is another object of the present invention to provide an improved discharging circuit which is compact in arrangement, and securely performs a discharging operation.

The present invention provides a cell discharging circuit for a fuel cell having a discharging path of the fuel cell via a discharging resistor, comprising:

means for switching, i.e., opening or closing the discharging path; and means for controlling the switching means in response to a self generating voltage of the fuel cell.

Here, the switching means may comprise a transistor connected in series to said discharging resistor and controlled by the means for controlling.

The operating means may comprise a Zener diode receiving the self generating voltage and the Zener diode may be connected to the means for switching.

The operating means may comprise a Zener diode receiving the self generating voltage and the Zener diode may be connected to the base of the transistor.

According to the present invention, even if a fixed resistor type control power source encounters a blackout, the discharging circuit can be maintained by utilizing the self-generating voltage of the fuel cell.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
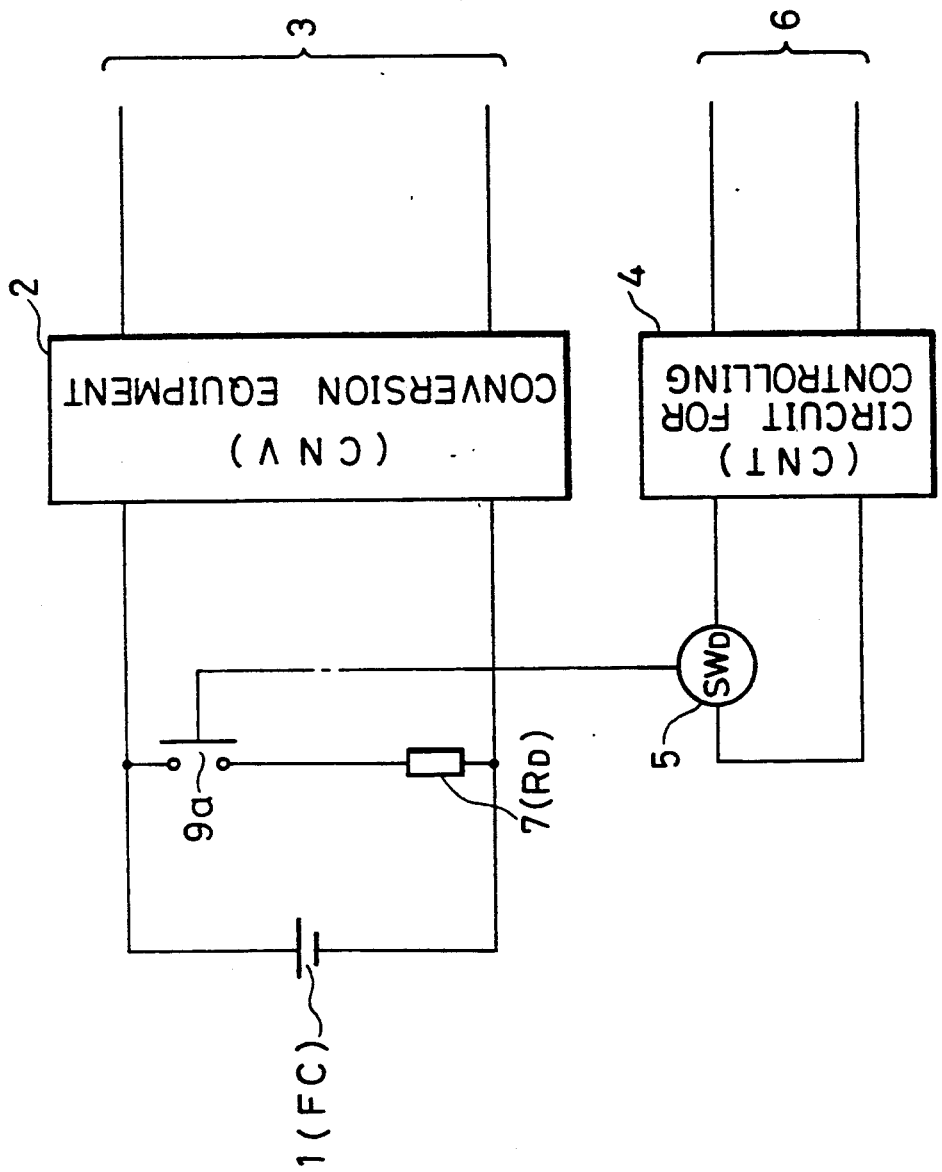
FIG. 1 is a circuit diagram showing a prior art fixed resistor type discharging circuit.
Figure 2:
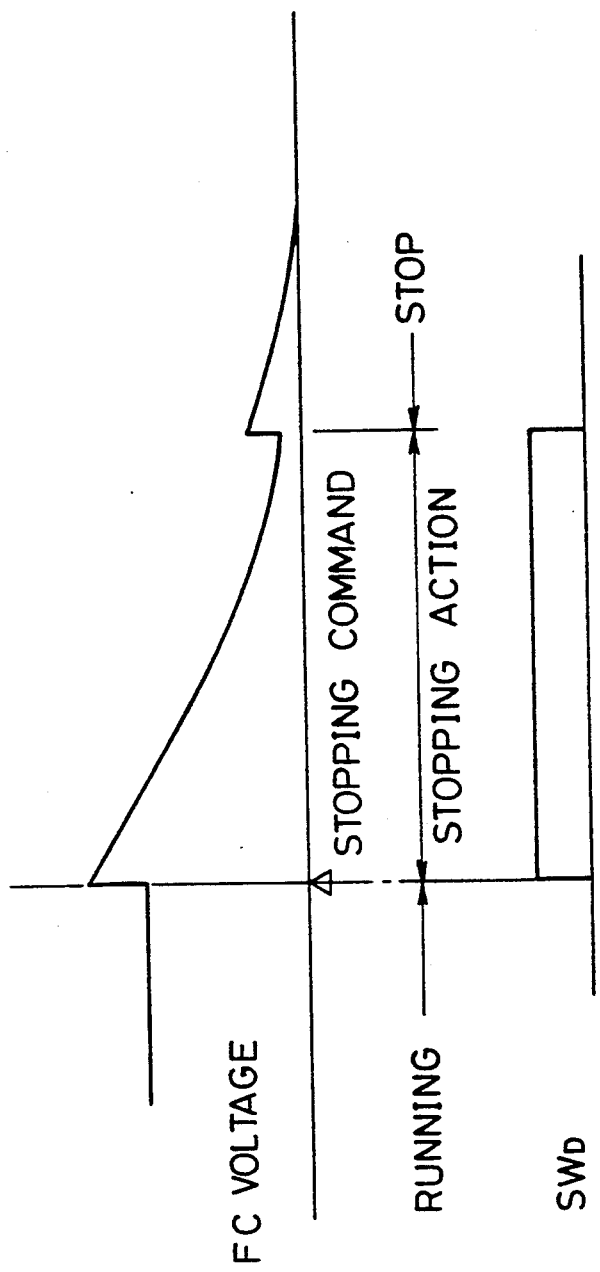
FIG. 2 is a timing chart showing an operation of the prior art circuit of FIG. 1.
Figure 3:
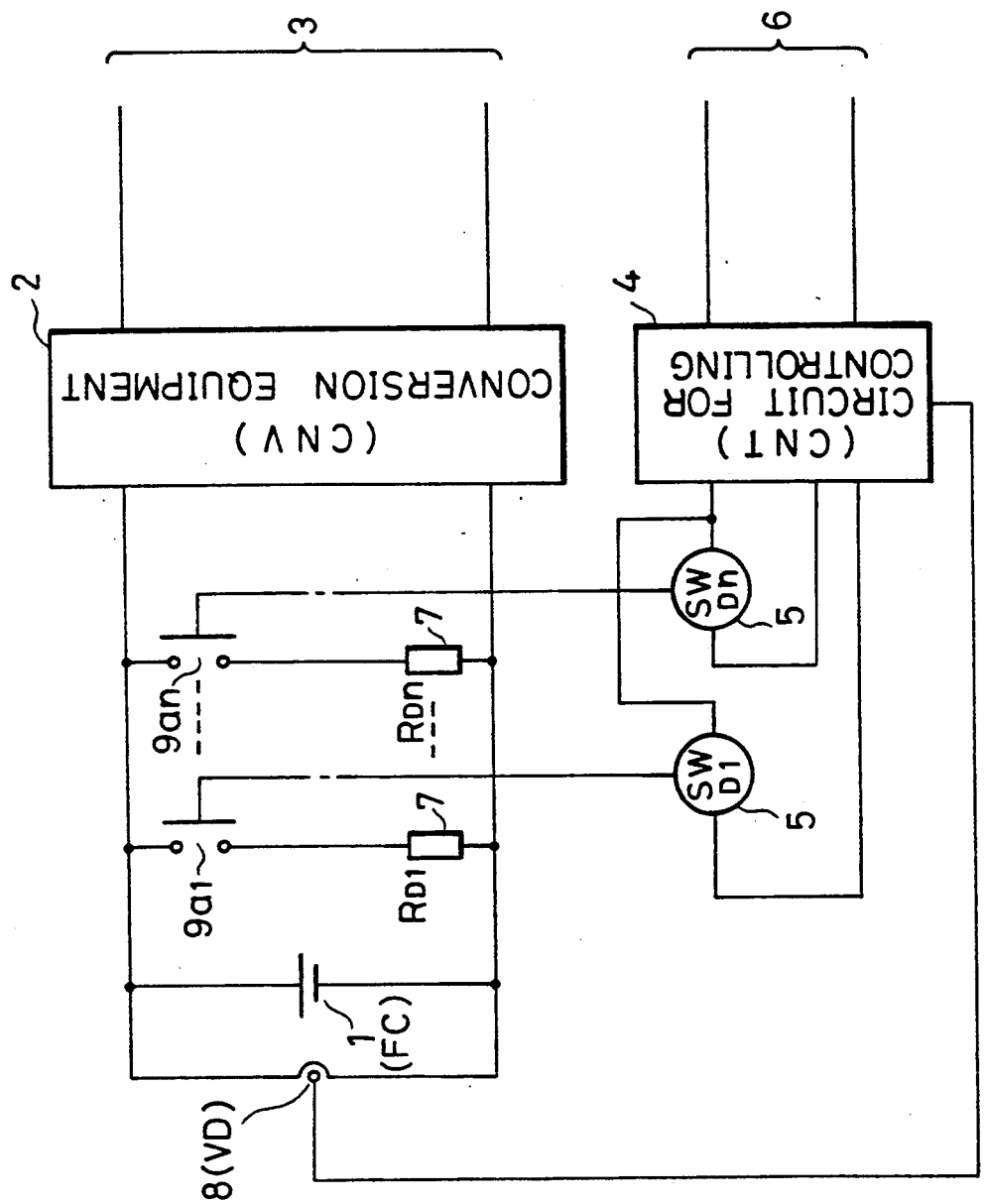
FIG. 3 is a circuit diagram showing a prior art variable resistor type discharging circuit.
Figure 4:
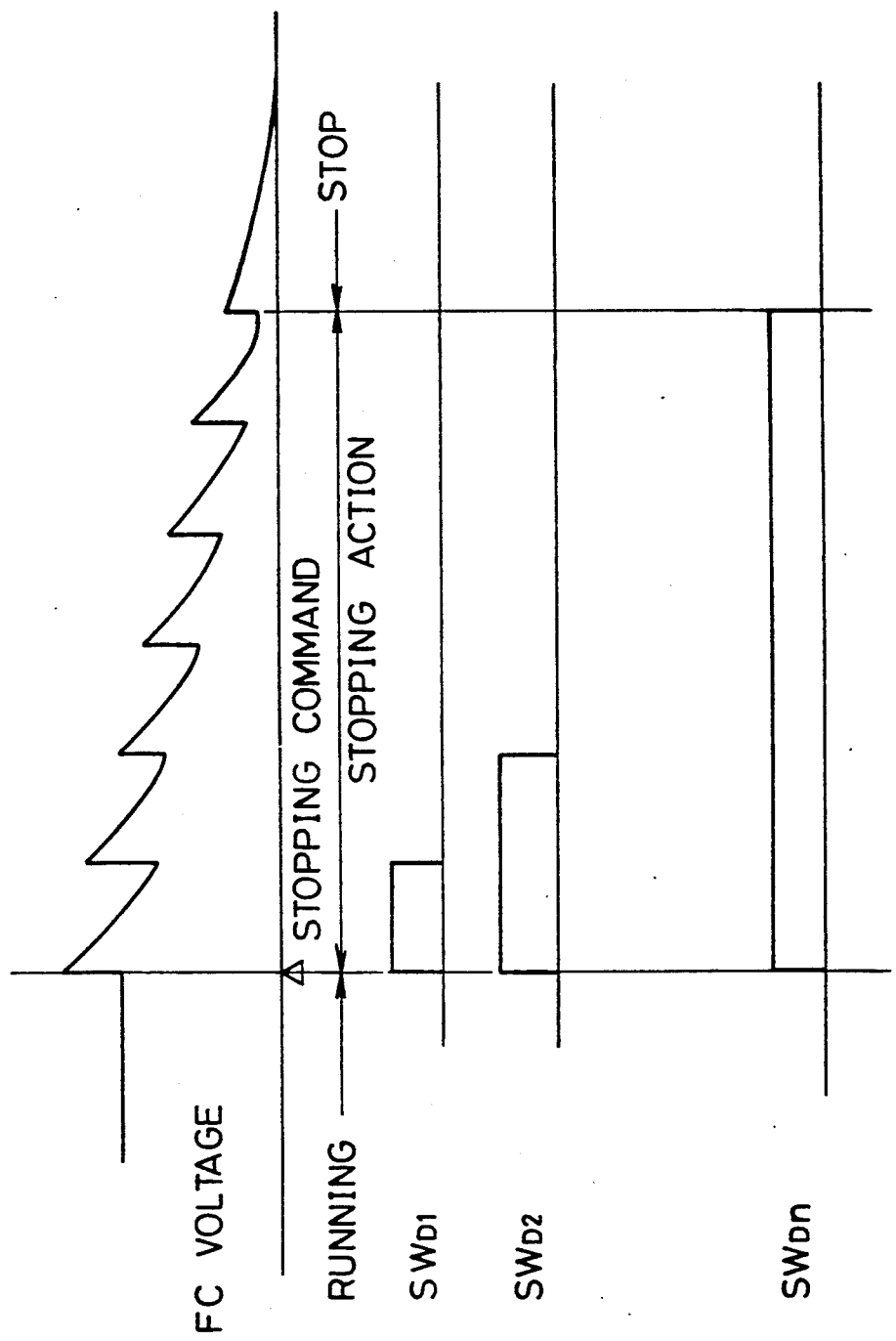
FIG. 4 is a timing chart showing an operation of the prior art circuit of FIG. 3.
Figure 5:
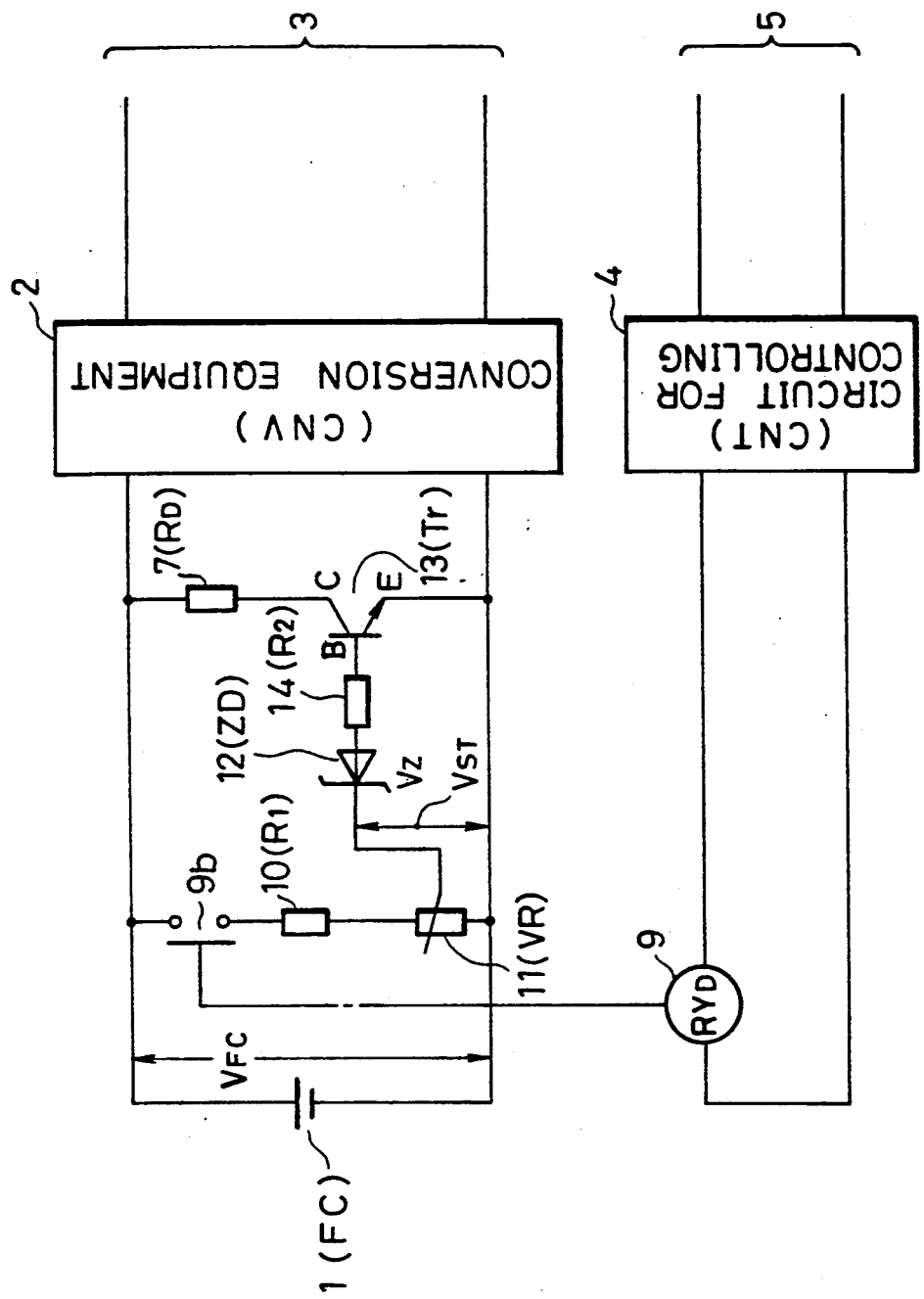
FIG. 5 is a circuit diagram showing an embodiment of a discharging circuit according to the present invention.
Figure 6:
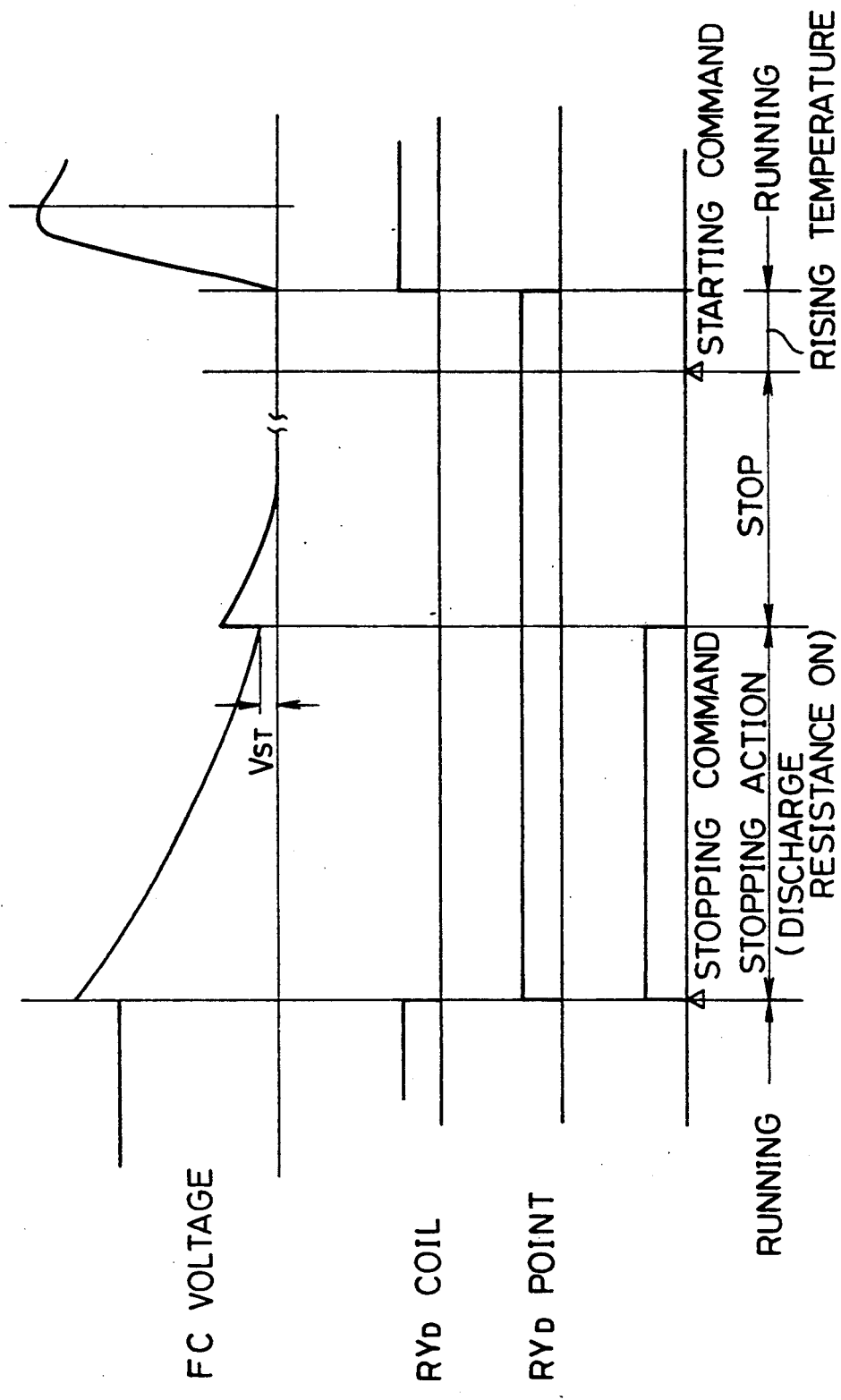
FIG. 6 is a timing chart showing an operation of the circuit according to the present invention of FIG. 5.

The present invention will be explained in detail while referring to the drawings, hereinafter. FIGS. 5 and 6 show an embodiment of a discharging circuit according to the present invention and its operational timing chart, respectively. In FIG. 5, the same reference numerals are given to the corresponding elements shown in FIG. 1.

With the halt command (ordinary halt) or a control power failure, the coil excitation of the relay (RYD) 9 is interrupted, so that relay contact 9b is closed, the relay 9 and contact 9b comprising a second switching means. For this reason, a circuit is formed by the fuel cell (FC) 1, a normally-closed relay contact 9b, the voltage dividing resistor (R1) 10 and the variable resistor impedance means (VR) 11. A current flows through this circuit because the fuel gas remaining in the fuel cell 1 generates a so-called self-generating voltage.

As a result, since the voltage $V_{ST}$ preset by the resistor 11 becomes higher than the voltage VZ of the Zener diode (ZD) 12, the first switching means (Tr) 13 becomes conductive due to its base current (B). As a result, a discharging circuit of the fuel cell 1 is formed by the discharging resistor (RD) 7, and the collector (C) and emitter (E) of the transistor 13, so that the fuel cell 1 can discharge. Reference numeral 14 denotes a base resistor (R2).

As shown in FIG. 6, the terminal voltage ($V_{FC}$) is gradually decreased through the discharging resistor 7. When the terminal voltage becomes lower than the preset voltage ($V_{ST}$), the current flowing through the Zener diode 12 is interrupted. This results in the off-state of the transistor 13 to interrupt the discharging operation. Then, the fuel cell 1 is in a natural discharging state.

Also, the discharging circuit is not formed at the start of operation of the fuel cell 1, because the relay 9 is excited to open the contact 9b immediately before the temperature increases and the gas is introduced into the fuel cell, and because the transistor 13 does not become conductive, even if the fuel cell 1 is in a state of generating electric power.

That is, when the fuel cell is in operation for generation, the discharging circuit is not established at all. On the other hand, when a halt command is outputted to the fuel cell from the controlling circuit 4, or when the power source for the controller fails, the discharging circuit is established so that the fuel cell discharges until the fuel cell voltage falls below the preset voltage ($V_{ST}$).

As described above, according to the present invention, since a discharging path for the fuel cell is established to discharge through a discharging resistor, the circuit can be made compact. Also, even if the operation of the fuel cell 1 is stopped; or the control power source for providing electric power to the controlling circuit fails, the discharging circuit maintains its operation by using the self-generating voltage of the fuel cell. As a result, the discharging circuit according to the present invention can prevent effectively the degradation of the fuel cell.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A discharging apparatus for a fuel cell having a self generating voltage, said discharging apparatus including a control circuit for controlling the fuel cell, comprising:

a discharging circuit connected to the fuel cell, said discharging circuit including switching means for opening and closing said discharging circuit in accordance with said self-generating voltage;

detecting means connected to said control circuit for detecting an interruption of power to the control circuit, said detecting means including a detecting circuit connected in parallel with said discharging circuit for detecting the self generating voltage of the fuel cell when interruption of power to the control circuit is detected by said detection means; and control means connected between said detecting means and said switching means, said control means controlling said switching means in accordance with the self generating voltage of the fuel cell to close said discharging circuit when power to said control circuit is interrupted.

2. A discharging apparatus as claimed in claim 1 wherein said discharging circuit further comprises a discharging resistor, and wherein said switching means comprises a transistor having a main conducting path connected in series with said discharging resistor and a control gate connected to said control means for opening and closing said main conducting path.

3. A discharging apparatus as claimed in claim 1, wherein said control means comprises a Zener diode receiving a voltage from said detecting means corresponding to the self generating voltage of said fuel cell.

4. A discharging apparatus as claimed in claim 2, wherein said control means comprises a Zener diode receiving a voltage from said detecting means corresponding to the self generating voltage of said fuel cell, said Zener diode being connected to the control gate of said transistor.

5. A discharging apparatus as claimed in claim 1, wherein said detecting means comprises a relay having a normally closed contact and a control input, said normally closed contact being opened when said control input is energized by said control circuit; and wherein said detecting circuit comprises a voltage divider connected in series with said normally closed contact for producing an output voltage corresponding to the self generating voltage applied to said control means.

6. A discharging apparatus as claimed in claim 2, wherein said transistor has a base, collector and emitter, and said control means comprises a Zener diode receiving a voltage from said detection means corresponding to the self generating voltage, said Zener diode being connected to the base of said transistor, and the collector and emitter of said transistor being in series with said discharging resistor.

7. A discharging apparatus as claimed in claim 2, wherein said detecting means comprises a relay having a normally closed contact and a control input, said normally closed contact being opened when said control input is energized by said control circuit; and wherein said detecting circuit comprises a voltage divider connected in series with said normally closed contact for producing an output voltage corresponding to the self generating voltage applied to said control means.

8. A discharging apparatus as claimed in claim 3, wherein said detecting means comprises a relay having a normally closed contact and a control input, said normally closed contact being opened when said control input is energized by said control circuit; and wherein said detecting circuit comprises a voltage divider connected in series with said normally closed contact for producing an output voltage corresponding to the self generating voltage applied to said Zener diode.

9. A discharging apparatus as claimed in claim 6, wherein said detecting means comprises a relay having a normally closed contact and a contact input, said normally closed contact being opened when said control input is energized by said control circuit; and wherein said detecting circuit comprises a voltage divider connected in series with said normally closed contact for producing an output voltage corresponding to the self generating voltage applied to said Zener diode.

10. In combination with a fuel cell, a fuel cell discharging apparatus including a control circuit for controlling the fuel cell, comprising
a discharging circuit connected across said fuel cell, said discharging circuit including a discharging resistor and a first switching means;
detecting means coupled to said control circuit for detecting an interruption of power to the control circuit, said detecting means including a detection circuit comprising a second switching means and impedance means, said second switching means connecting said impedance means across said fuel cell when interruption of power to the control circuit is detected by said detection means; and
control means coupled between said first switching means and said impedance means, said control means controlling said first switching means to connect said discharging resistor across said fuel cell after said detecting circuit has been connected across said fuel cell and the voltage across said fuel cell exceeds a predetermined magnitude.

11. A fuel cell discharging apparatus as claimed in claim 10 wherein said first switching means comprises a transistor.

12. A fuel cell discharging apparatus as claimed in claim 10 wherein said first switching means comprises a transistor having base, emitter and collector electrodes, said impedance means comprises a variable resistor, and said control means comprises a zener diode coupled between said variable resistor and the base electrode of said transistor.

13. A fuel cell discharging apparatus as claimed in claim 12 wherein said discharging resistor is connected in series with the collector and emitter electrodes of said transistor.

* * * * *